March 21, 1939.          R. PAWSAT          2,151,485
REFLECTOR MOUNTING FOR BICYCLE AXLES
Filed Sept. 17, 1937

INVENTOR.
Reuben Pawsat
BY Frank Bugelter
ATTORNEY.

Patented Mar. 21, 1939

2,151,485

UNITED STATES PATENT OFFICE 2,151,485

REFLECTOR MOUNTING FOR BICYCLE AXLES

Reuben Pawsat, Maysville, Ky., assignor to Wald Mfg. Co., Inc., Maysville, Ky., a corporation of Kentucky Application September 17, 1937, Serial No. 164,358

5 Claims. (Cl. 88—81)

This invention relates to means for mounting rosettes, hub caps and the like upon bicycle axles. Rosettes or hub caps of the character under consideration, ordinarily comprise a glass or other frangible lens like member and by reason of the deficiencies of the means heretofore used for attaching such lens like members, it has been common to break such lenses.

An object of the invention is to provide a simple and effective mounting for hub caps, comprising frangible lens like members, and wherein the lens like members are firmly secured, yet same are protected against the action of parts that heretofore were mainly responsible for damage to and breaking of such lenses and the like.

Another object is to provide a device of the character mentioned, which may be expeditiously produced and applied to bicycle axles, without change in the standard construction of bicycles.

These and other objects are attained by the means described herein and disclosed in the accompanying drawing, in which.

Figures 1, 2:
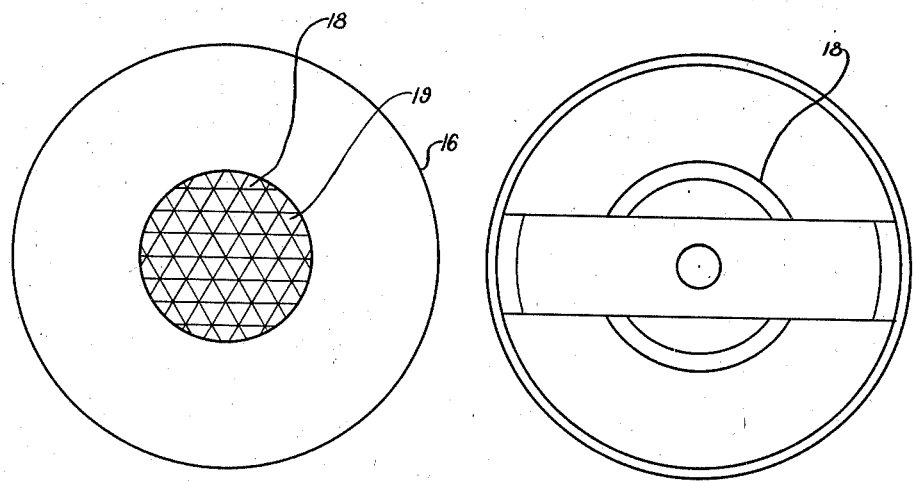
Fig. 1 is a front view of a bicycle hub cap embodying the invention.
Fig. 2 is a rear view of the device shown in Fig. 1.
Figure 3:
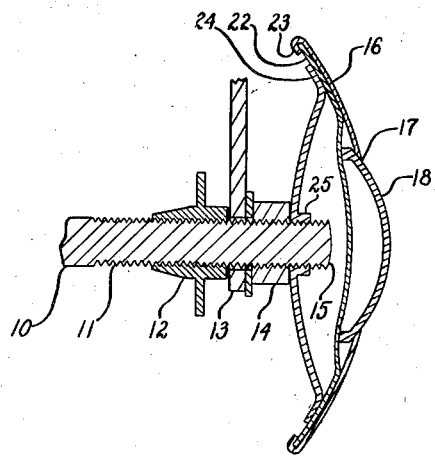
Fig. 3 is a sectional view through a device embodying the invention showing same mounted on a conventional bicycle spindle or axle and various parts conventionally associated with such axle or spindle.

The bicycle axle or spindle 10 is screw threaded at each of its ends as shown at 11. A conventional bearing 12 for a wheel, is mounted on the axle. The fork 13 of the bicycle frame is secured against the bearing 12 by the nut 14. Upon the extreme end 15 of the axle 10, it is customary to mount some type of hub cap.

The hub cap 16, shown herein is an annular disk having a central opening 17 in which a lens or reflecting rosette 18 is disposed. These rosettes or lenses are ordinary glass buttons or disks, having a plurality of facets 19 upon their outer face and having suitable reflecting material upon their inner faces in accordance with customary practice. These lenses are ordinarily made of red or green glass and therefore, during both the day and night seasons they reflect red and green rays.

The inner face of the disk 16 carries a transverse plate 22, the opposite ends of which are secured by and beneath the inturned peripheral flange 23 formed on the disk. The plate 22 is imperforate and extends between the lens 18 and the extreme outer end 15 of axle 10 when the hub cap is mounted on the axle. The hub cap is mounted on the axle by means of a strap or mounting plate 24. The strap or plate 24 has its ends secured to the plate 22 by welding or the like, and has a threaded bore 25 for receiving the threaded end of the axle. Ordinarily the assembly of bearing 12, fork 13 and nut 14 on axle 10, is such that by screwing the attachment plate 24 upon the axle until the plate 24 frictionally engages the nut 14, no danger of fracture of the lens 18 is involved. Many times however, the assembly on the axle may be such that before the attachment plate abuts the nut 14, the end 15 of the axle may contact and break the lens 18. By interposing the imperforate protector plate 22 between the mounting plate 24 and lens 18, thereby to provide a secondary stop or abutment for the axle end, the lens is protected from contact by the axle. Under such circumstances the frictional contact of the axle end upon the protector plate is sufficient to prevent separation of the hub cap and the axle, although the attachment plate 24 may not be in contact with the nut 14.

What is claimed is:

1. The combination with a cycle fork having an axle bearing, and a threaded axle loosely received in said bearing, means for fixing the axle relative to the fork at varying degrees of outward extension of its ends, of a hub cap for an end of the axle, said hub cap comprising an external plate, a frangible lens supported by said plate, a transverse mounting plate fixed interiorly of the external plate and having a threaded bore into which the threaded axle is screwed, the external plate and its associated frangible lens being thereby advanced toward the axle end, and a protector plate fixed between the exterior plate and the mounting plate, providing an abutment in the path of relative extension of the axle toward the frangible lens, said protector plate providing an auxiliary stop against which the excessively extended axle end may be tightened.

2. In a structure of the class described, the combination of a cycle wheel axle having a threaded end, and a mounting plate having an internally threaded bore for the reception of the threaded axle end, one face of said plate providing a primary abutting area for normally engaging an axle nut, an external plate having a central aperture of diameter considerably larger than that of the threaded bore of the mounting plate, a lens having an outer face in registry with the central aperture of the external plate, and an inner face bounded by a peripheral annular flange whose diameter is greatly in excess of the axle diameter and therefore disposed at a considerable radial distance from the axle end, and a protective plate fixed relative to the mounting plate between the lens and the mounting plate, one face of said plate providing a secondary stop for the axle end, and the opposite face providing an annular seat radially distant from the axle end for support of the annular flange of the lens at points remote from the location at which the axle may strike and deform said protective plate.

3. In a structure of the class described, the combination of a cycle wheel axle having a threaded end, and a mounting plate having an internally threaded bore for reception of the threaded axle end, one face of said plate providing a primary abutting area for normally engaging an axle nut, an external plate having a central aperture of diameter considerably larger than that of the threaded bore of the mounting plate, a lens having an inner face, and an outer face in registry with the central aperture of the external plate, said lens being of a diameter considerably greater than the threaded bore of the mounting plate, a protective plate fixed relative to the external plate and disposed between the lens and the mounting plate, said protective plate providing on one face thereof a seat for the periphery of the lens radially remote from the axle line of the device, and providing on the other face thereof a secondary abutment area against which an axle end may strike and bear, upon movement of the primary abutting area along the axle to the extent that the axle end contacts said protective plate.

4. The combination of an axle, a hub cap having an opening therein of a diameter considerably larger than that of the axle, means for mounting the cap on the axle with the axle aligned with said opening, said means being movable with said cap, longitudinally of said axle, incident to mounting the cap on the axle, a concavo-convex lens having its concave side facing but spaced from the axle end and its convex side extending through the opening in the cap, a protective plate of an area considerably in excess of the cross-sectional area of the axle, carried by the cap and interposed between the lens and axle, said plate spanning the concavity of the lens and bearing upon the lens periphery at a substantial radial distance from the axle, whereby force applied by the axle to the center of said plate when the hub cap is applied to the axle, is distributed gently to the radially remote periphery of the lens.

5. The combination with a mounting means, of a threaded axle which under varying circumstances may assume various degrees of extension relative to its mounting means, a hub cap having a central opening therein, a plate carried by the cap and having a threaded bore therein aligned with the opening in the cap and having screw threaded engagement with the axle, a frangible disk received in the opening in the cap and a relatively substantial shock absorbing protective plate mounted upon the cap in spaced relation to the frangible disk, and between the disk and the first mentioned plate, in position to abut and impinge upon the end of the axle when the axle is excessively extended through the threaded bore aforesaid.

REUBEN PAWSAT.